(12) United States Patent
Herath

(10) Patent No.: US 7,356,083 B2
(45) Date of Patent: Apr. 8, 2008

(54) DATA COMPRESSION SYSTEM AND METHOD

(75) Inventor: Jeffrey Alan Herath, Virginia Beach, VA (US)

(73) Assignee: Vianix Delaware, LLC, Boston, MA (US)

( * ) Notice: Subject to any disclaimer, the term of this patent is extended or adjusted under 35 U.S.C. 154(b) by 996 days.

(21) Appl. No.: 10/676,491

(22) Filed: Oct. 1, 2003

(65) Prior Publication Data

US 2004/0091042 A1   May 13, 2004

Related U.S. Application Data

(60) Division of application No. 09/602,316, filed on Jun. 23, 2000, now Pat. No. 6,661,845, which is a continuation-in-part of application No. 09/481,949, filed on Jan. 12, 2000, now abandoned.

(60) Provisional application No. 60/115,819, filed on Jan. 14, 1999.

(51) Int. Cl.
*H04B 1/66* (2006.01)
*H04N 7/12* (2006.01)
*H04N 11/02* (2006.01)
*H04N 11/04* (2006.01)

(52) U.S. Cl. ............... 375/240.23; 375/240; 375/249; 704/501

(58) Field of Classification Search ........... 375/240.23, 375/240.24, 249, 250, 240; 341/67; 712/300; 386/112; 704/500, 501
See application file for complete search history.

(56) References Cited

U.S. PATENT DOCUMENTS

| | | | | |
|---|---|---|---|---|
| 5,440,345 A | * | 8/1995 | Shimoda | 375/240.14 |
| 5,530,750 A | | 6/1996 | Akagiri | |
| 5,532,694 A | * | 7/1996 | Mayers et al. | 341/67 |
| 5,636,316 A | * | 6/1997 | Oku et al. | 386/112 |
| 5,881,104 A | | 3/1999 | Akahane | |
| 5,978,757 A | | 11/1999 | Newton | |
| 6,185,525 B1 | | 2/2001 | Taubenheim et al. | |
| 6,252,945 B1 | | 6/2001 | Hermann et al. | |
| 6,865,668 B1 | * | 3/2005 | Benes et al. | 712/300 |
| 2006/0251333 A1 | * | 11/2006 | Boon | 382/246 |

* cited by examiner

*Primary Examiner*—Phuong Phu
(74) *Attorney, Agent, or Firm*—Stoll Keenon Ogden PLLC; David J. Clement; Stephen C. Hall

(57) ABSTRACT

This invention produces data packets that can vary in length and/or data compression ratio. First, an algorithm is employed to transform a data signal into fixed or variable length data packets at variable data compression ratios. If the algorithm produces fixed length data packets, the fixed length data packets are then converted to variable length data packets, which include only the valid data bytes of the fixed length data packets. Finally, the variable compression ratio, variable length data packets are provided with length codes at each end of each data packet to facilitate bi-directional searching and decompression. The transition from fixed to variable length data packets employs a buffer which stores the fixed length data packets until the fixed length data packets are converted to variable length data packets. The variable length, variable compression ratio data packets require a reduced amount of transmission and/or storage space and increase the reproduction quality of the stored and/or transmitted data.

22 Claims, 6 Drawing Sheets

300

← 20mSec →

310

320

326  320  325

DATA COMPRESSION SYSTEM AND METHOD

This application is a Divisional application of prior U.S. patent application Ser. No.: 09/602,316, filed Jun. 23, 2000 now U.S. Pat. No. 6,661,845, which is a Continuation-in-Part application of U.S. patent application Ser. No.: 09/481,949, filed Jan. 12, 2000, now abandoned, which claims the benefit of U.S. Provisional Application No.: 60/115,819 filed on Jan. 14, 1999. The entire disclosure of the prior application(s) is hereby incorporated by reference herein in its entirety.

BACKGROUND OF THE INVENTION

1. Field of the Invention

This invention relates to data compression.

2. Description of Related Art

Currently, it is well known to record, transfer, and/or store data, such as, for example, documents, files, folders, pictures, sounds, music, videos, or the like, in the form of individual data files. Additionally, it is well known that large scale archiving and retrieval of data files can require high-capacity storage devices and media. Furthermore, it is also known that the transfer and storage of large quantities of data is increasing.

Generally, there are two methods for increasing the efficiency and reducing the cost associated with manipulating data. The first method involves increasing the rate at which data is transferred. By increasing the data transfer rate, a user can, for example, download a particular data file more quickly. However, increasing the data transfer rate does not reduce the amount of space needed to store the data once it has been transferred, or downloaded.

The second method for increasing the efficiency and reducing the cost of manipulating data involves decreasing the size of the data file itself, also known as compressing the data file. By compressing a particular data file, both the time required to transfer the data file and the amount of space needed to store the data file is reduced.

Data file compression is typically accomplished by dividing a data file into equal length data segments called data packets. Each data packet is then compressed, using a predetermined data compression ratio. The compressed data packets are then stored and/or transferred as a new, smaller data file.

Various data compression techniques can be used to compress a particular data file. However, when data is compressed, the reproduction quality of the compressed data is reduced because data reproduction quality is inversely proportional to the data compression ratio. To illustrate, if a user saves a piece of music on his or her computer, using a high data compression ratio, the stored music file will take up less storage space on the user's computer than the music would if it had been saved using a low data compression ratio. However, when the user replays the stored piece of music, the music will not sound as clear as it would have if the music had been saved using a low data compression ratio.

Therefore, if a particular data compression technique uses a high data compression ratio, the size of the data file containing the compressed data will be smaller, but the data reproduction quality will be reduced. In contrast, if a low data compression technique is used to compress the data, the data reproduction quality will be higher, but the resulting data file may be extremely large.

As a result, when data is recorded, stored, and/or transferred, a choice must be made between increased data file size and increased data reproduction quality.

Typically, a moderate data compression ratio is selected. Using a moderate data compression ratio allows the overall size of the data file to be reduced enough to allow somewhat convenient data file manipulation while allowing the data reproduction quality to be high enough to provide the user with a tolerable level of data reproduction distortion. Once a data compression ratio is chosen, the data compression ratio is applied to all of the data packets in the data file.

SUMMARY OF THE INVENTION

When data is transferred and/or stored to, for example, a computer hard drive with a large amount of available memory capacity, data compression may not be critical because the computer's hard drive can accommodate data files that are quite large. However, when data files are transmitted over low speed systems, or systems that operate in a low bandwidth, data compression becomes important. Similarly, when data is recorded, transferred, and/or stored to a device in which storage space is highly restricted or expensive, such as, for example, a personal digital assistant (PDA), a pager, or a cellular telephone, data compression is a primary factor. For at least these types of devices, a more efficient data compression system and method is particularly critical.

When fixed length data packets and fixed data compression ratios are used to manipulate data, as described above, the amount of data transmission and/or storage space is not effectively minimized for any given data file. This is primarily because the data compression ratio is constant for the entire data file. If, for example, a user wants to raise the data reproduction quality of a particular segment of a data file, the user must lower the data compression ratio for the entire data file.

Furthermore, fixed length packets waste space. Excess space in each data packet, such as, for example, data representing a period of silence or invalid data in a packet of audio data, is not removed. Instead, the excess space is filled with zeros or other null data so that the fixed data packet length is maintained.

Therefore, in order to increase the efficient use of available recording, transmission, and/or storage space, the systems and methods of this invention use variable compression ratio, variable length data packets to compress data. Instead of applying a fixed data compression ratio to all of the data packets, the systems and methods of this invention analyze each data packet individually and determine an appropriate data compression ratio for each data packet. By compressing each data packet in a data file at an appropriately determined compression ratio, the result is a smaller data file with improved data reproduction quality.

When the data is, for example, audio or video data, the amount of data in each data packet varies with time because audio and/or video data has varying periods of silence and varying densities of information per unit of time. Text data, by way of contrast, is typically consistent per unit of time.

If, for example, as shown in FIG. 3, a particular data packet contains a minimal amount of data, such as, for example, 5 bytes of data, the data compression ratio for that particular data packet is increased. A data packet might contain a minimal amount of data if the data packet is, for example, an audio data packet that represents mostly silence.

Although setting the data compression ratio at an increased level produces reduced data reproduction quality, an increased data compression ratio produces a reduced number of bits and therefore requires a smaller amount of recording, transmission, and/or storage space. Furthermore, since the data compression ratio is increased only for data packets containing a minimal amount of data, an increased data compression ratio is less significant when compared to overall data reproduction quality.

Conversely, if, as shown in FIG. 4, a particular data packet contains a significant level of data such as, for example, 20 bytes of data, a lower level of data compression is used. This lower level of data compression provides increased data reproduction quality for each data packet containing a significant amount of data. A data packet might contain a significant amount of data if the data packet is, for example, an audio data packet that represents a voice or music.

Although setting the data compression ratio at a lower level produces a larger data packet, a lower data compression ratio produces improved data reproduction quality. Furthermore, since the data compression ratio is lowered only for data packets containing a significant amount of data, the overall size of the resulting data file is not adversely effected.

Once the data within the data packet is compressed using an appropriate compression ratio, the data packet is converted from a fixed length data packet into a variable length data packet. The specific length of each data packet is determined by the number of valid data bytes in that particular data packet. Valid data bytes are data bytes that actually represent sound, such as, for example, a voice, or music. In contrast, invalid data bytes are data bytes that can represent, for example, periods of silence. When the invalid data bytes are removed, the remaining, valid data bytes are compressed to produce a smaller data packet.

Since each data packet represents a short period of time, such as, for example, 20 milliseconds, the overall reproduction quality of the resulting data file is not reduced by the variable compression ratios of the data packets.

Because both the data compression ratio and the length of each data packet can vary from data packet to data packet, it is critical that these data packet characteristics be specified for each data packet. Additionally, particularly with audio and/or video data, a user must be able to search data files in a forward, a backward, or a mid-file mode. Therefore, the systems and methods of this invention provide a length code at both the beginning and end of each data packet. The end bytes of these opening and closing length codes are used to identify the number of valid data bytes in each data packet.

Because the number of valid data bytes in each data packet varies with, and is directly related to, the data compression ratio, identifying the number of valid data bytes in each data packet actually identifies the data compression ratio used to compress each data packet as well. Therefore, when the number of valid data bytes in a particular data packet is known, the data within that data packet can be decompressed and used. Thus, the length code is the only code that must appear in the opening and closing code portion of each data packet.

Although the need for length codes at each end of each data packet adds extra bytes to each data packet, the ability to use variable data compression ratios in combination with variable length data packet more than compensates for the space required for the length codes.

Although this method of using variable length, variable data compression ratio data packets has been described with reference to compression of existing data files, the data compression techniques of this invention can also be used to compress data that is received in the form of a continuous stream of real time data. Real time data can be, for example, the live audio and/or video transmission of a concert or sporting event. Typically, when data is manipulated in real time, the data is input through a buffer. The buffer stores at least a portion of the incoming data until the incoming data is translated into compressed data packets as described above.

Accordingly, when a flow of data is received, the valid data is extracted from the data flow and converted to variable length, variable data compression ratio data packets. In various exemplary embodiments, the conversion from a continuous data flow to variable length, variable data compression ratio data packets entails buffering at least a portion of the data flow and converting the data flow into fixed length data packets. These fixed length data packets are then converted to variable length, variable data compression ratio data packets, as described herein. In various other exemplary embodiments, the systems and methods of this invention can be designed to convert data into variable data compression ratio, variable length data packets, without a transition to or from fixed length data packets.

This invention separately provides systems and methods that improve overall data reproduction quality and convey an impression of enhanced audio quality.

This invention separately provides systems and methods that extend recording time without reducing overall data reproduction quality.

The systems and methods of this invention separately provide an improved level of data reproduction quality, as compared to systems utilizing fixed data compression ratios at the same data or compression rates.

This invention provides systems and methods that produce improved audio quality by increasing data reproduction quality relative to data density.

The systems and methods of this invention provide increased data compression ratios that only reduce data reproduction quality for low density data packets, and decreased data compression ratios that only increase the data reproduction quality for high density data packets.

This invention separately provides systems and methods that utilize different data compression ratios depending upon the amount of data that is being recorded, stored, and/or transmitted.

This invention separately provides systems and methods that convert data into variable data compression ratio, variable length data packets.

This invention separately provides systems and methods that allow the data reproduction quality to be raised or lowered within any given data packet.

This invention separately provides systems and methods that produce data packets with a minimized size.

This invention separately provides systems and methods that reduce the number of invalid data bytes in any given data packet.

This invention separately provides systems and methods that allow compressed data files to be built from real time data streams without the need for a powerful computer or personal digital assistant (PDA).

This invention separately provides systems and methods that increase the speed and efficiency of the user's computer or PDA.

This invention separately provides systems and methods that decrease the amount of storage space that a given data file consumes on a user's computer or PDA.

These and other features and advantages of this invention are described in or are apparent from the following detailed description of the exemplary embodiments.

BRIEF DESCRIPTION OF THE DRAWINGS

The exemplary embodiments of this invention will be described in detail, with reference to the following figures, wherein.

DETAILED DESCRIPTION OF THE PREFERRED EMBODIMENT

For simplicity and clarification, the operating principles, design factors, and layout of the data compression systems and methods according to this invention are explained with reference to various exemplary embodiments of the data compression systems and methods according to this invention. The basic explanation of the operation of the data compression systems and methods is applicable for the understanding and design of the constituent components employed in the data compression systems and methods of this invention.

Furthermore, it should be appreciated that, for simplicity and clarification, the embodiments of this invention will be described with reference to audio data. However, it should be appreciated that the systems and methods of this invention can be implemented to compress audio data, such as, for example, sound, voice, or music data, as well as other forms of recordable, storable, and/or transferable data, such as, for example, video data.

It should also be appreciated that the term "data file" is for basic explanation and understanding of the operation of the data compression systems and methods. Therefore, the term "data file" is not to be construed as limiting the data compression systems and methods of this invention. Furthermore, for the sake of simplicity, in the various exemplary embodiments described herein, for example, the data compression systems and methods are described with respect to compression of a data file. Alternatively, the data compression systems and methods of this invention also operate to compress data that is input in the form of a continuous, or real time, data stream, as described above.

Figure 1:
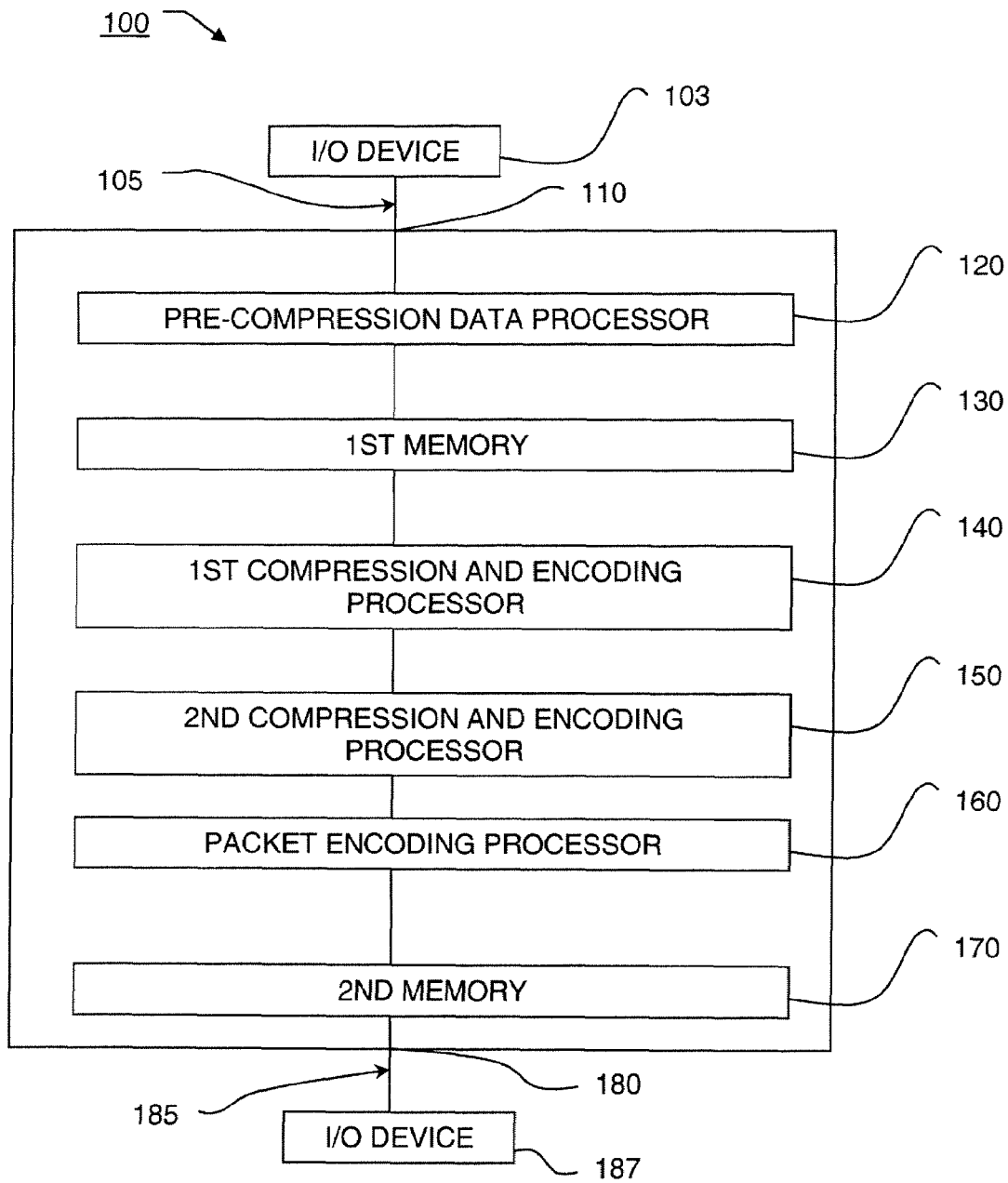
FIG. 1 is a functional block diagram outlining an exemplary embodiment of the data compression system according to this invention.

FIG. 1 is a functional block diagram outlining a first exemplary embodiment of the data compression system 100 according to this invention. As shown in FIG. 1, the data compression system 100 includes at least some of an input interface 110, a pre-compression data processor 120, a first memory 130, a first compression and encoding processor 140, a second compression and encoding processor 150, a packet encoding processor 160, a second memory 170, and an output interface 180.

The input interface 110 interfaces with one or more input/output devices 103 to receive an input data signal 105. The output interface 180 interfaces with one or more input/output devices 187 to output a compressed data signal 185.

The one or more input/output devices 103 can be any known or later developed source that is capable of providing the input data signal 105 to the data compression system 100 of this invention. Similarly, the one or more input/output devices 187 can be any known or later developed device that is capable of receiving the compressed output data signal 185 from the data compression system 100 and either storing, transmitting, or displaying the compressed data.

Additionally, the first memory 130 is at least a buffer that stores at least one fixed length data packet until the fixed length data packet is converted to a variable length data packet. Similarly, the second memory 170 is at least a buffer that stores at least one variable length, variable compression ratio data packet until the variable length, variable compression ratio data packet is output as at least a portion of the compressed data signal 185.

As shown in FIG. 1, the first memory 130 and the second memory 170 can each be implemented, either collectively or individually, using any appropriate combination of alterable, volatile or non-volatile memory or non-alterable, or fixed, memory. The alterable memory, whether volatile or non-volatile, can be implemented using any one or more of non-selectable or dynamic RAM, a floppy disk and disk drive, a writable or re-rewriteable optical disk and disk drive, a hard drive, flash memory or the like. Similarly, the non-alterable or fixed memory can be implemented using any one or more of ROM, PROM, EPROM, EEPROM, an optical ROM disk, such as a CD-ROM or DVD-ROM disk, and disk drive or the like.

As shown in FIG. 1, the pre-compression data processor 120, the first compression and encoding processor 140, the second compression and encoding processor 150, and the packet encoding processor 160 can each be implemented, either collectively or individually, using any appropriate combination of alterable, volatile or non-volatile memory or non-alterable, or fixed, memory. The alterable memory, whether volatile or non-volatile, can be implemented using any one or more of non-selectable or dynamic RAM, a floppy disk and disk drive, a writable or re-rewriteable optical disk and disk drive, a hard drive, flash memory or the like. Similarly, the non-alterable or fixed memory can be implemented using any one or more of ROM, PROM, EPROM, EEPROM, an optical ROM disk, such as a CD-ROM or DVD-ROM disk, and disk drive or the like.

In the various exemplary embodiments described herein, the data compression system 100 interfaces with various input/output devices 103 and 187 through a direct wired connection using the input interface 110 and/or the output interface 180. Alternatively, the data compression system 100 can interface with various input/output devices 103 and 187 using the input interface 110 and/or the output interface 180, through a linked connection. The linked connection can be any known or later developed device or system for connecting the data compression system 100 to the various input/output devices, including a wireless link, a connection over a LAN, a WAN, or any other distributed network, a connection over the public switched telephone network, a connection over a coaxial cable (i.e., CATV) system, a connection over a cellular telephone network, a satellite connection or the like. In general, the linked connection can be any known or later developed connection system or structure usable to connect the data compression system 100 to the various input/output devices 103 and 187, including both wired and wireless connections.

In various exemplary embodiments, the data compression system 100 will be included as part of the software executing on a computer or PDA. It should be appreciated that any other known or later developed system capable of processing and outputting data could be used in place of the computer or PDA.

During operation of one exemplary embodiment of the data compression system 100, an analog signal representing, for example, voice, music, or video, is input into the data compression system 100, through the input interface 110, as the input data signal 105. When the analog input data signal 105 is input into the data compression system 100, the pre-compression data processor 120 converts the analog input data signal 105 to a digital input data signal.

Then, the pre-compression data processor 120 divides the digital input data signal into fixed length data packets. The length of each data packet is chosen so that data packets having increased data compression ratios are not readily discernible to be of reduced audio quality when compared to data packets having decreased data compression ratios. In various exemplary embodiments, each data packet is 20 milliseconds in length.

Once at least a portion of the digital input data signal has been divided into fixed length data packets, at least one fixed length data packets is stored in the first memory 130. The first memory 130 operates as a buffer that stores the at least one fixed length data packet until the at least one fixed length data packet can be processed by the first compression and encoding processor 140. In various exemplary embodiments, one fixed length data packet is held in the first memory 130 at any given time. Alternatively, multiple fixed length data packets can be held in the first memory 130.

Next, the at least one data packet is processed by the first compression and encoding processor 140. When the first compression and encoding processor 140 receives the at least one fixed length data packet from the first memory 130, the at least one fixed length data packet is analyzed to determine the amount of data in the at least one fixed length data packet. Once the amount of data is determined, the at least one fixed length data packet is compressed using an appropriate data compression ratio, as described above.

Then, the compressed, fixed length data packet is transferred to the second compression and encoding processor 150. The second compression and encoding processor 150 converts the fixed length data packet into a variable length data packet by removing any unnecessary data bytes and leaving only the valid data bytes of the fixed length data packet.

The resulting variable length, variable data compression ratio data packet is then transferred to the packet encoding processor 160. The packet encoding processor 160 inserts at least a length code at both ends of the data packet. As described above, the length codes contain at least information regarding the number of valid data bytes in the variable length, variable data compression ratio data packet.

After the length codes are added to the data packet, the data packet is stored in the second memory 170. The second memory 170 operates as a buffer that stores the variable compression ratio, variable length data packets until the variable compression ratio, variable length data packets can be output, via the output interface 180, to the input/output device 187 as the output data signal 185. In various exemplary embodiments, the second memory 170 stores the variable length, variable data compression ratio data packets until either the entire, or some portion, of the input data signal 105 has been compressed using the data compression system 100. Alternatively, the second memory 170 stores all of the output variable length, variable data compression ratio data packets as a data file.

In various exemplary embodiments, the input data signal 105 is directly converted to variable data compression ratio, variable length data packets, without being transformed to and from fixed length data packets. The decision as to how the input signal is processed or pre-processed is determined in large part by the basic systems that are being interfaced by the systems and methods of this invention.

Figure 2:
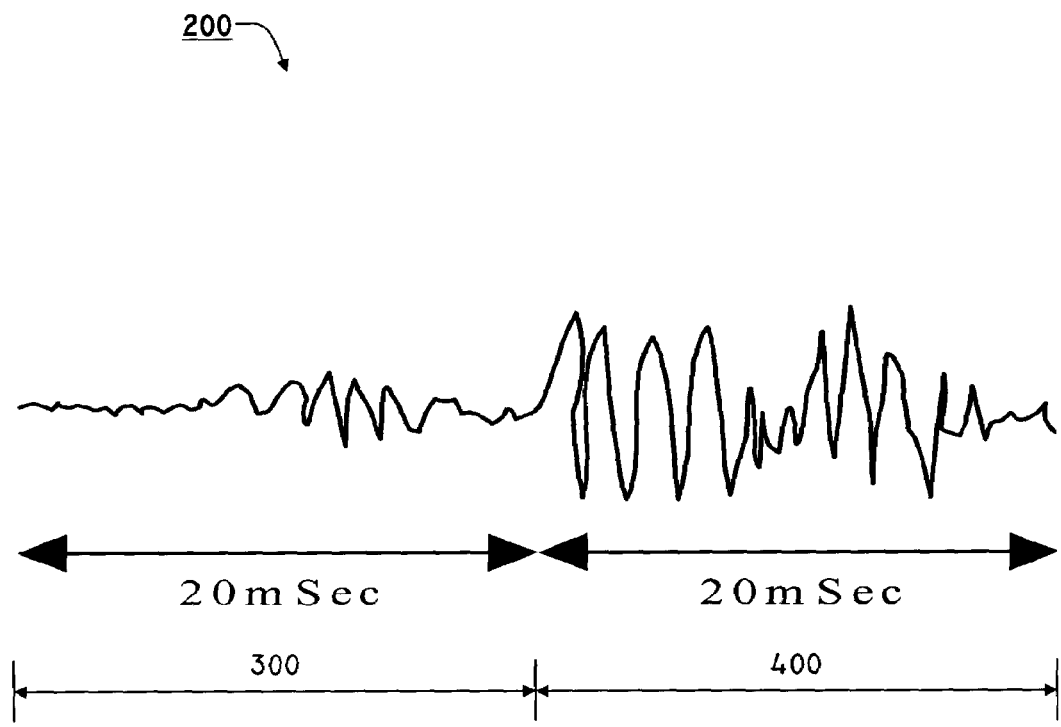
FIG. 2 is a schematic illustration of an analog audio input data signal.

FIG. 2 is a schematic illustration of an analog audio input data set. As shown in FIG. 2, the analog audio input data set 200 is divided into a data segment 300 and a data segment 400. In this illustration, the data segments 300 and 400 are time synchronized files, 20 milliseconds in duration. Obviously, shorter or longer time periods can be used to divide an analog audio input data set. The data segment 300 represents an audio signal containing a minimal amount of data. In contrast, the data segment 400 represents an audio signal containing a significant amount of data.

Figure 3A:
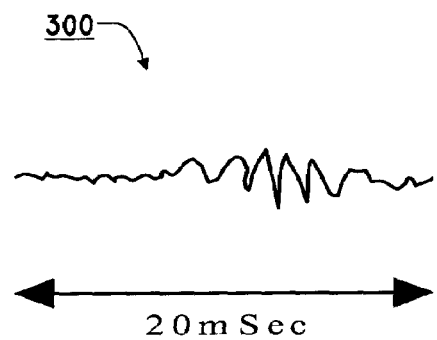
FIGS. 3A-3D are schematic illustrations of data compression encoding of an analog audio input data signal according to this invention.

FIGS. 3A-3D are schematic illustrations of data compression encoding of an analog audio input data set according to this invention. FIG. 3A shows the data segment 300 of the analog audio input data set 200.

Figure 3B:

FIG. 3B is illustrative of a data packet 310. The data packet 310 represents a data packet containing the compressed data from the data segment 300. The data segment 300 is analyzed, as described above, and since the data segment 300 contains a minimal amount of data, a high data compression ratio was used to produce the data packet 310.

Figure 3C:
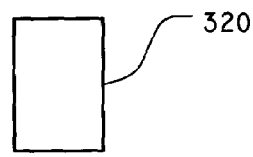

FIG. 3C shows a data packet 320. The data packet 320 represents the data packet 310 after the length of the data packet 310 has been adjusted so that the data packet 320 contains only the valid data bytes.

Figure 3D:
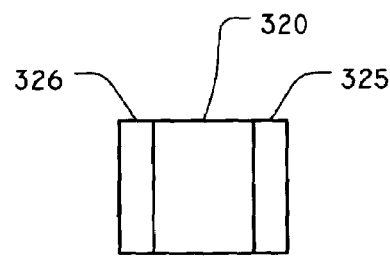

FIG. 3D shows the data packet 320 after a length code 325 is added to the beginning of the data packet 320 and an identical length code 326 is added to the end of the data packet 320.

Figure 4A:
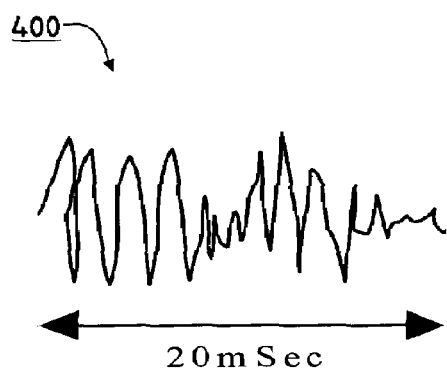
FIGS. 4A-4D are schematic illustrations of data compression encoding of an analog audio input data signal according to this invention.

FIGS. 4A-4D are further schematic illustrations of data compression encoding of an analog audio input data set according to this invention. FIG. 4A shows the data segment 400 of the analog audio input data set 200.

Figure 4B:
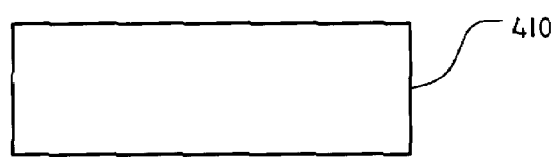

FIG. 4B is illustrative of a data packet 410. The data packet 410 represents a data packet containing the compressed data from the data segment 400. The data segment 400 is analyzed, as described above, and since the data segment 400 contains a substantial amount of data, a low data compression ratio was used to produce the data packet 410.

Figure 4C:
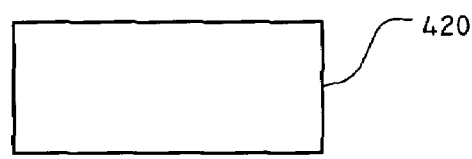

FIG. 4C shows a data packet 420. The data packet 420 represents the data packet 410 after the length of the data packet 410 has been adjusted so that the data packet 420 contains only the valid data bytes.

Figure 4D:
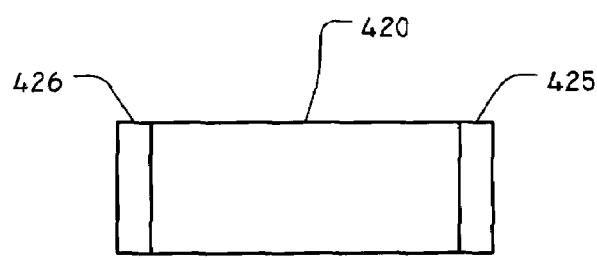

FIG. 4D shows the data packet 420 after a length code 425 is added to the beginning of the data packet 420 and an identical length code 426 is added to the end of the data packet 420.

Figure 5:
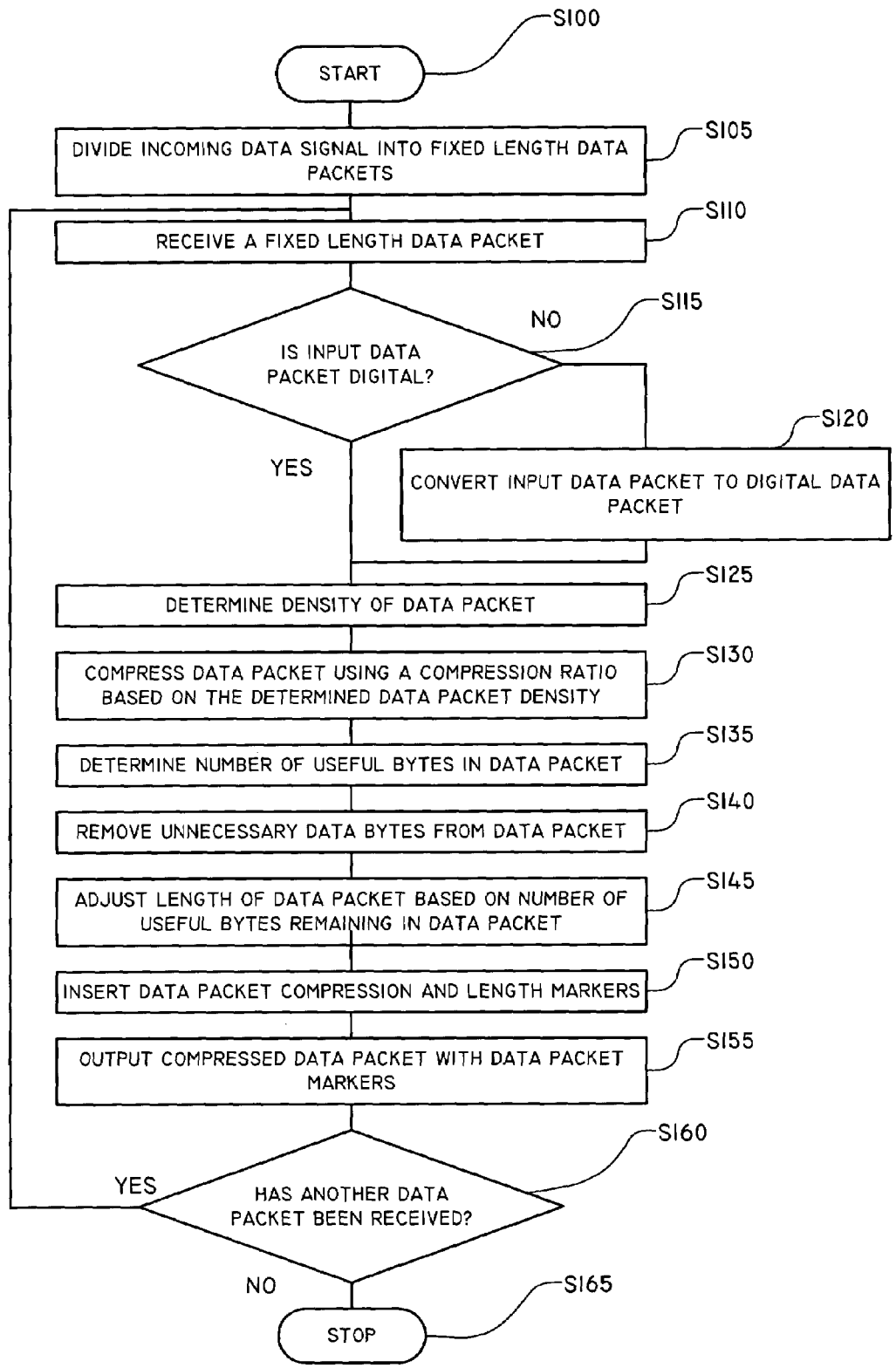
FIG. 5 is a flowchart outlining one exemplary embodiment of a method for compressing data according to this invention.

FIG. 5 is a flowchart outlining one exemplary embodiment of a method for compressing data according to this invention.

As shown in FIG. 5, beginning in step S100, control continues to step S105, where at least one uncompressed input signal is received. Next, in step S110, a determination is made whether the received input signal is a digital signal.

If, in step S110, it is determined that the received input signal is a digital signal, control advances to step S115. Otherwise, control advances to step S120.

In step S115, the received input signal is converted to a digital signal. Control then advances to step S120.

In step S120, at least one data packet is received. Each data packet represents a certain, fixed period of time. In various exemplary embodiments, each data packet represents a 20 millisecond period of time. Control then continues to step S125.

In step S125, the information density of the data packet is determined. Then, in step S130, the data packet is compressed using a data compression ratio that corresponds to the determined information density of the data packet. The data compression ratio is, for example, a high data compression ratio if the data packet is determined to be a low-density data packet or a low data compression ratio if the data packet is a high-density data packet. Control then advances to step S135.

In step S135, the number of valid data bytes in the compressed data packet is determined. Then, in step S140, any unnecessary data bytes are removed from the data packet. Next, in step S145, the length of the compressed data packet is adjusted based on the number of valid data bytes remaining in the compressed data packet. Control then advances to step S150.

In step S150, data packet length codes are inserted at the beginning and the end of the compressed, variable length data packet. The length codes contain information regarding the determined number of valid data bytes in the data packet as well as the period of time that the data packet represents. Next, in step S155, the compressed, variable length data packet is output with the data length codes. Control then advances to step S160.

In step S160, a determination is made whether a stop command has been received. If, in step S160 a stop command has been received, control jumps to step S170 and the method ends. Otherwise, control advances to step S165.

In step S165, a determination is made whether another fixed length data packet has been received within a predetermined period of time. If, in step S165, it is determined that another fixed length data packet has been received within the predetermined period of time, control returns to step S120. Otherwise, control jumps to step S170 and the method ends.

Figure 6:
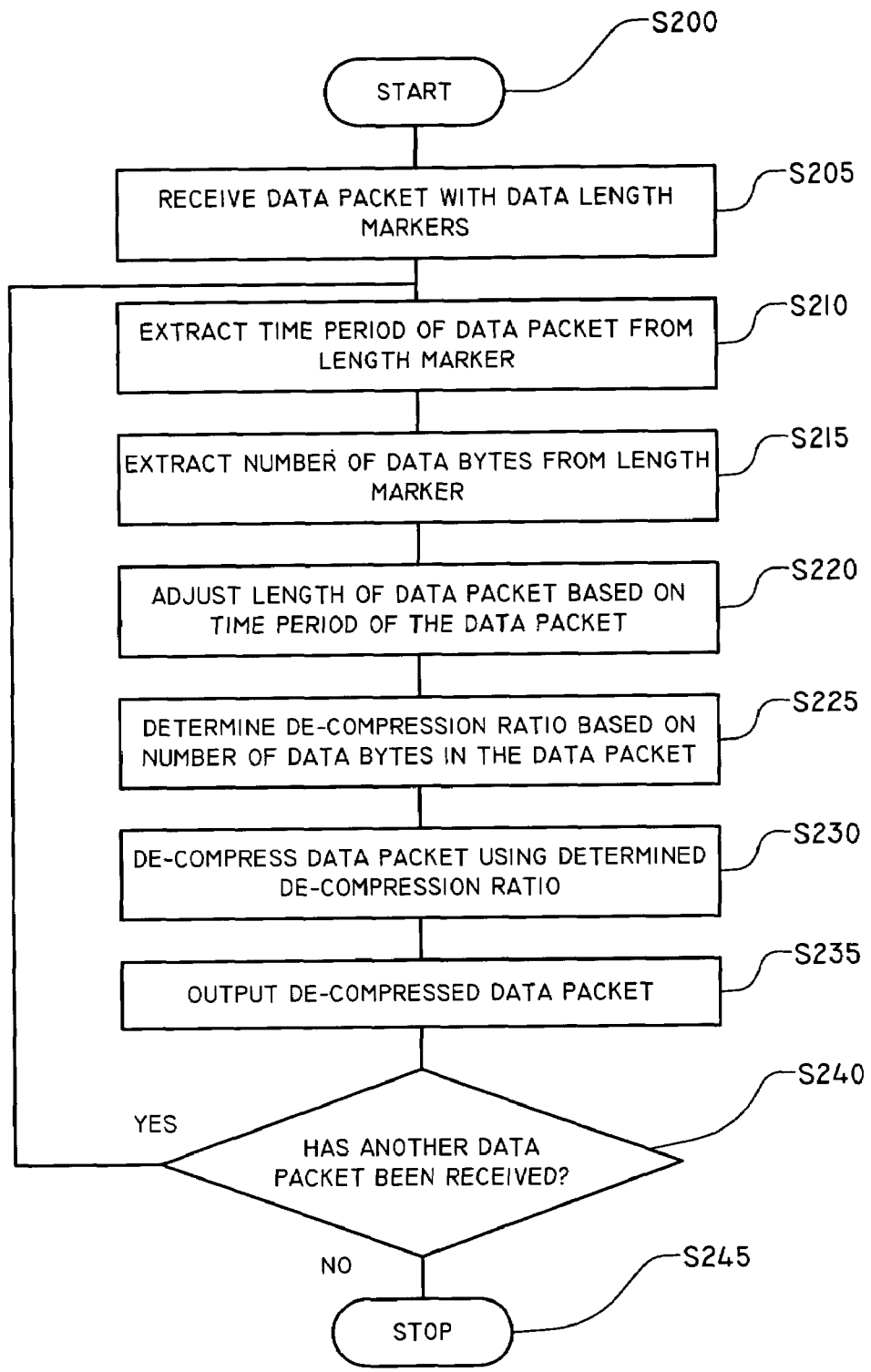
FIG. 6 is a flowchart outlining one exemplary embodiment of a method for de-compressing data according to this invention.

FIG. 6 is a flowchart outlining one exemplary embodiment of a method for de-compressing data according to this invention.

As shown in FIG. 6, beginning in step S200, control continues to step S205, where a variable length, variable data compression ratio data packet is received. If the received data packet is a variable length, variable data compression ratio data packet, the data packet must include at least a length marker at the beginning of the data packet. Next, in step S210, information regarding the period of time that the data packet represents is extracted from the data packet's length code. In various exemplary embodiments, the period is 20 milliseconds. Control then advances to step S215.

In step S215, information regarding the number of data bytes contained in the data packet is extracted from the data packet's length code. Then, in step S220, the length of the data packet is adjusted based on the time period information extracted from the data packet's length code. Control then advances to step S225.

In step S225, a de-compression ratio is determined based on the number of data bytes contained in the data packet. As described above, the number of data bytes in the data packet is inversely proportional to the data compression ratio. Likewise, the number of data bytes in the data packet is inversely proportional to the data de-compression ratio. Control then advances to step S230.

In step S230, the data packet is de-compressed using the determined data de-compression ratio. Then, in step S235, the de-compressed data packet is output as described above, with reference to FIG. 1. Control then advances to step S240.

In step S240, a determination is made whether another variable length, variable data compression ratio data packet has been received. If, in step S240, another variable length, variable data compression ratio data packet has been received, control returns to step S210. Otherwise, control advances to step S245 and the method ends.

It should be understood that each of the elements of the data compression system 100 shown in FIG. 1 can be implemented as portions of a suitably programmed general-purpose computer. Alternatively, each of the elements of the data compression system 100 shown in FIG. 1 can be implemented as physically distinct hardware circuits within an ASIC, or using a FPGA, a PDL, a PLA or a PAL, or using discrete logic elements or discrete circuit elements. The particular form that each of the elements of the data compression system 100 shown in FIG. 1 will take is a design choice and will be predicable to those skilled in the art.

Moreover, the data compression system 100 can be implemented as software executing on a programmed general-purpose computer, a special purpose computer, a microprocessor or the like. In this case, the data compression system 100 can be implemented by physically incorporating it into a software and/or hardware system, such as the hardware or firmware systems of another personal digital assistant, bi-directional pager, analog or digital cellular phone or the like. The data compression system 100 can also be implemented as a routine embedded in a network client, as a resource residing on a network server, or the like.

Thus, in summary, the data compression system 100 can be implemented on a programmed general purpose computer, a special purpose computer, a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA or PAL, or the like. In general, any device, capable of implementing a finite state machine that is in turn capable of implementing the flowcharts shown in FIGS. 5 and 6 can be used to implement the data compression system 100.

While this invention has been described in conjunction with the exemplary embodiments outlined above, it is evident that many alternatives, modifications and variations will be apparent to those skilled in the art. Accordingly, the exemplary embodiments of the invention, as set forth above, are intended to be illustrative, not limiting. Various changes may be made without departing from the spirit and scope of the invention.

What is claimed is:

1. A method of decompressing an input compression encoded data set wherein the input compression encoded data set in comprised of variable compression ratio, variable length data packets, the method comprising:

receiving a compression encoded data set;

dividing the received compression encoded data set into variable compression ratio, variable length data packets;

determining a fixed length for all of the data packets;
determining a density for each data packet;
adjusting the variable length of each variable compression ratio, variable length data packet to the determined fixed length by adding a group of data bytes to the variable compression ratio, variable length data packet in order to form a variable compression ratio, fixed length data packet;
determining an appropriate decompression ratio to apply to each variable compression ratio, fixed length data packet;
decompressing each fixed length data packet using the determined decompression ratio;
outputting the decompressed data.

2. The method of claim 1, wherein determining a fixed length for all of the data packets includes determining the fixed length of each data packet based on the length code.

3. The method of claim 2, wherein the time period is twenty milliseconds.

4. The method of claim 1, wherein determining a density for each data packet includes determining the number of valid data bytes in each data packet.

5. The method of claim 1, wherein determining the number of valid data bytes in each data packet includes extracting the number of valid data bytes in each data packet from a length code of each data packet.

6. The method of claim 5, wherein extracting the number of valid data bytes in each data packet from a length code of each data packet includes extracting the number of valid data bytes from a length code at a beginning of each data packet.

7. The method of claim 5, wherein extracting the number of valid data bytes in each data packet from a length code of each data packet includes extracting the number of valid data bytes from a length code at an end of each data packet.

8. The method of claim 1, wherein adjusting the variable length of each variable compression ratio, variable length data packet to the determined fixed length includes buffering at least one variable length data packet until the variable length of the at least one variable length data packet is adjusted to a fixed length.

9. The method of claim 1, wherein adjusting the variable length of each variable compression ratio, variable length data packet to the determined fixed length includes adding null set data bytes to any valid data bytes in each variable compression ratio, fixed length data packet to expand the variable length of each variable compression ratio, variable length data packet.

10. The method of claim 1, wherein determining an appropriate decompression ratio to apply to each variable compression ratio, fixed length data packet includes determining the appropriate decompression ratio based on the determined density for each data packet.

11. An apparatus for decompressing data, comprising:
an input circuit that receives incoming compressed data, wherein the incoming compressed data includes at least one variable compression ratio, variable length data packet including at least a length code;
a data packet decoding processor that determines the length of the at least one variable compression ratio, variable length data packet based on the length code;
a first decompression processor that converts the at least one variable compression ratio, variable length data packet into at least one variable compression ratio, fixed length data packet;
a second decompression processor that determines the amount of data in the at least one variable compression ratio, fixed length data packet, and decompresses the at least one variable compression ratio, fixed length data packet into at least one decompressed, fixed length data packet, using a determined data decompression ratio; and
an output circuit that outputs the at least one decompressed, fixed length data packet.

12. The apparatus of claim 11, wherein the fixed length of each fixed length data packet is determined by the length code.

13. The apparatus of claim 11, wherein the fixed length of each fixed length data packet is 20 milliseconds in length.

14. The apparatus of claim 11, wherein the determined data decompression ratio is determined based on the amount of data in the at least one variable compression ratio, fixed length data packet.

15. The apparatus of claim 11, wherein the first decompression processor converts the at least one variable compression ratio, variable length data packet into at least one variable compression ratio, fixed length data packet by adding null set data bytes the at least one variable compression ratio, variable length data packet to expand the variable length of the at least one variable compression ratio, variable length data packet.

16. The apparatus of claim 11, wherein the apparatus also includes:
a first memory that stores the at least one variable compression ratio, variable length data packet until the at least one variable compression ratio, variable length data packets can be processed by the first decompression processor.

17. The apparatus of claim 11, wherein the apparatus also includes:
a second memory that stores the at least one decompressed, fixed length data packet until the at least one decompressed, fixed length data packet can be output, via the output circuit.

18. A system for decompressing data, the system comprising:
an input circuit that receives incoming compressed data, wherein the incoming compressed data includes at least one variable compression ratio, variable length data packet including at least a length code;
a data packet decoding processor that determines the length of the at least one variable compression ratio, variable length data packet based on the length code;
a first decompression processor that converts the at least one variable compression ratio, variable length data packet into at least one variable compression ratio, fixed length data packet by adding null set data bytes to the at least one variable compression ratio, variable length data packet to expand the variable length of the at least one variable compression ratio, variable length data packet;
a second decompression processor that determines the amount of data in the at least one variable compression ratio, fixed length data packet, and decompresses the at least one variable compression ratio, fixed length data packet into at least one decompressed, fixed length data packet, using an appropriate data decompression ratio, wherein the appropriate decompression ratio is based on the amount of data in the at least one variable compression ratio, fixed length data packet; and
an output circuit that outputs the at least one decompressed, fixed length data packet.

19. The system of claim 18, wherein the fixed length of each fixed length data packet is determined by the length code.

20. The system of claim 18, wherein the fixed length of each fixed length data packet is 20 milliseconds in length.

21. The system of claim 18, wherein the system also includes:
a first memory that stores the at least one variable compression ratio, variable length data packet until the at least one variable compression ratio, variable length data packet can be processed by the first decompression processor.

22. The system of claim 18, wherein the system also includes:
a second memory that stores the at least one decompressed, fixed length data packet until the at least one decompressed, fixed length data packet can be output, via the output circuit.

* * * * *